United States Patent
Hagan (10) Patent No.: US 12,312,231 B2
(45) Date of Patent: May 27, 2025

(54) SYSTEMS AND METHODS OF LIQUID EXTRACTION FROM EMPTY BARRELS

(71) Applicant: Ernst & Young U.S. LLP, New York, NY (US)

(72) Inventor: Zachary James Hagan, Lee's Summit, MO (US)

(73) Assignee: Ernst & Young U.S. LLP, New York, NY (US)

( * ) Notice: Subject to any disclaimer, the term of this patent is extended or adjusted under 35 U.S.C. 154(b) by 0 days.

(21) Appl. No.: 18/945,017

(22) Filed: Nov. 12, 2024

(65) Prior Publication Data

US 2025/0066182 A1    Feb. 27, 2025

Related U.S. Application Data

(62) Division of application No. 18/155,308, filed on Jan. 17, 2023.

(Continued)

(51) Int. Cl.
*B67D 1/08* (2006.01)
*B67D 1/10* (2006.01)
(Continued)

(52) U.S. Cl.
CPC ......... *B67D 1/0885* (2013.01); *B67D 1/0895* (2013.01); *B67D 1/10* (2013.01);
(Continued)

(58) Field of Classification Search
CPC ............ B67D 1/0895; B67C 3/16; C12H 1/22
See application file for complete search history.

(56) References Cited

U.S. PATENT DOCUMENTS 765,148 A    7/1904  Philip
815,464 A    3/1906  Thomas
(Continued)

FOREIGN PATENT DOCUMENTS

CN    206937544 U    1/2018
CN    209696314 U    11/2019
(Continued)

OTHER PUBLICATIONS

*Exothermics, Inc. v. Ernst & Young U.S. LLP et al.*, Civil Action No. 1:24-cv-00290 (U.S. District Court, District of New Hampshire), "Civil Case Cover Sheet," filed Sep. 16, 2024; 2 pages.
(Continued)

*Primary Examiner* — Jason K Niesz
(74) *Attorney, Agent, or Firm* — COOLEY LLP (57) ABSTRACT

Embodiments described herein relate to systems and methods of extracting liquid from empty barrels. In one aspect, a method includes heating a barrel with less than about 10 ml of free liquid disposed therein to expand pores in the barrel. The method further includes applying, after the heating, a negative pressure to an interior of a vessel in which the barrel is disposed, such that an amount of liquid is extracted from the barrel. The method includes collecting, after the applying, the amount of liquid within a collection container. In some embodiments, collecting the amount of liquid includes pumping the liquid through a tube that is disposed between an outer surface of the barrel and the collection container. In some embodiments, heating the barrel is via a heated blanket wrapped around the barrel. In some embodiments, heating the barrel is via placing the barrel in an oven.

17 Claims, 5 Drawing Sheets

Related U.S. Application Data (60) Provisional application No. 63/300,425, filed on Jan. 18, 2022.

(51) Int. Cl.
*B67C 3/16* (2006.01)
*C12H 1/22* (2006.01)

(52) U.S. Cl.
CPC ...... *B67C 3/16* (2013.01); *B67D 2210/00102* (2013.01); *C12H 1/22* (2013.01)

(56) References Cited

U.S. PATENT DOCUMENTS

| | | |
|---|---|---|
| 1,002,704 A | 9/1911 | Knoche |
| 1,990,266 A | 2/1935 | Caywood |
| 3,001,877 A | 9/1961 | Shapiro |
| 5,132,136 A | 7/1992 | Sato et al. |
| 6,755,118 B1 | 6/2004 | McGinty |
| 9,383,314 B2 | 7/2016 | Malcolm et al. |
| 11,384,324 B2 | 7/2022 | Albrecht |
| 2002/0168446 A1 | 11/2002 | Zimlich et al. |
| 2010/0124725 A1 | 5/2010 | Waterman |
| 2010/0275784 A1 | 11/2010 | Cumplido Matesanz |
| 2015/0307425 A1 | 10/2015 | Cox |
| 2016/0208206 A1 | 7/2016 | Nicholls et al. |
| 2016/0348046 A1 | 12/2016 | Wood |
| 2018/0171274 A1 | 6/2018 | Deal |
| 2019/0048301 A1* | 2/2019 | Maroy ............. B01D 53/22 |
| 2020/0054962 A1 | 2/2020 | Vanaman et al. |
| 2020/0188812 A1 | 6/2020 | Galyuk |
| 2020/0224135 A1 | 7/2020 | Call |
| 2020/0237840 A1 | 7/2020 | Morrow |
| 2022/0298458 A1 | 9/2022 | Bolton |
| 2023/0227302 A1 | 7/2023 | Hagan |

FOREIGN PATENT DOCUMENTS

| | | |
|---|---|---|
| DE | 2645273 A1 | 4/1978 |
| EP | 3564354 A1 | 11/2019 |
| ES | 2354555 B2 | 8/2011 |
| FR | 572427 A | 6/1924 |
| FR | 2307037 A1 | 11/1976 |
| FR | 2844805 B1 | 12/2004 |
| GB | 124330 A | 3/1919 |
| GB | 2530299 A | 3/2016 |
| WO | WO-2012017110 A1 | 2/2012 |
| WO | WO-2023141420 A1 | 7/2023 |

OTHER PUBLICATIONS

*Exothermics, Inc. v. Ernst & Young U.S. LLP et al.*, Civil Action No. 1:24-cv-00290 (U.S. District Court, District of New Hampshire), "Complaint," filed Sep. 16, 2024; 34 pages.

*Exothermics, Inc. v. Ernst & Young U.S. LLP et al.*, Civil Action No. 1:24-cv-00290 (U.S. District Court, District of New Hampshire), "Exhibit A to the Complaint," filed Sep. 16, 2024; 52 pages.

*Exothermics, Inc. v. Ernst & Young U.S. LLP et al.*, Civil Action No. 1:24-cv-00290 (U.S. District Court, District of New Hampshire), "Exhibit B to the Complaint," filed Sep. 16, 2024; 49 pages.

*Exothermics, Inc. v. Ernst & Young U.S. LLP et al.*, Civil Action No. 1:24-cv-00290 (U.S. District Court, District of New Hampshire), "Exhibit C to the Complaint," filed Sep. 16, 2024; 49 pages.

*Exothermics, Inc. v. Ernst & Young U.S. LLP et al.*, Civil Action No. 1:24-cv-00290 (U.S. District Court, District of New Hampshire), "Exhibit D to the Complaint," filed Sep. 16, 2024; 1 page.

International Search Report and Written Opinion for International Application No. PCT/US2023/060739, by Ernst & Young U.S. LLP, mailed May 16, 2023; 14 pages.

* cited by examiner

SYSTEMS AND METHODS OF LIQUID EXTRACTION FROM EMPTY BARRELS

CROSS-REFERENCE TO RELATED PATENT APPLICATION

This application is a divisional of U.S. patent application Ser. No. 18/155,308, now U.S. Pat. No. 12,281,004, filed Jan. 17, 2023, which claims priority to and benefit of U.S. Provisional Application No. 63/300,425, filed Jan. 18, 2022, titled "Systems and Methods of Liquid Extraction From Empty Barrels," the entire disclosure of each of which is incorporated herein by reference in its entirety.

TECHNICAL FIELD

One or more embodiments described herein relate to extraction of liquid from empty barrels.

BACKGROUND

Oak barrels and casks are often used to age spirits. Long term exposure of spirits to oak leads to very rich, complex flavors. The porosity of the oak leads to better exposure of the spirits to the wood. The porosity, however, can also trap the liquids in the wood after the emptying of the barrel. The trapped liquid eventually evaporates or is lost from selling the empty barrel or from using the empty barrel for other products. This is product loss and reduces the overall yield of a barrel of whiskey. Economic consequences of such losses can be non-trivial. By extracting and recovering the trapped liquid, such losses can be reduced significantly.

SUMMARY

Embodiments described herein relate to systems and methods of extracting liquid from empty barrels. In one aspect, a method includes heating a barrel with less than about 10 mL of free liquid disposed therein to expand pores in the barrel. The method further includes applying, after the heating, a negative pressure to an interior of a vessel in which the barrel is disposed, such that an amount of liquid is extracted from the barrel. The method includes collecting, after the applying, the amount of liquid within a collection container. In some embodiments, collecting the amount of liquid includes pumping the liquid through a tube that is disposed between an outer surface of the barrel and the collection container. In some embodiments, heating the barrel is via a heated blanket wrapped around the barrel. In some embodiments, heating the barrel is via placing the barrel in an oven. In some embodiments, the method can further include contacting a surface of a funnel to an outer surface of the barrel via a gasket.

In one aspect, an apparatus is described herein, the apparatus including a vessel that receives a barrel with less than about 10 mL of free liquid, a base frame on a floor of the vessel, the base frame configured to support the barrel placed thereon, and a tube configured to receive liquid flowing from the barrel while an interior of the vessel is under a negative pressure and transport the liquid from the interior of the vessel to outside the vessel. In some embodiments, the apparatus further includes a funnel disposed within the interior of the vessel. The funnel can receive the liquid flowing from the barrel while under negative pressure and transport the liquid to the tube. In some embodiments, the apparatus can include a pump disposed outside the vessel and fluidically coupled to the tube. The pump can facilitate movement of liquid through the tube. In some embodiments, the apparatus can include a hole on the floor of the vessel. The tube can be disposed through the hole with gaskets disposed around the tube to form a seal with the hole. In some embodiments, the base frame can include a plurality of metal bars with the funnel placed in a gap between the plurality of metal bars. In some embodiments, the vessel can include a first door and a second door opposite the first door. Each of the first door and the second door can be sized and configured so that the barrel can be rolled into and out of the interior of the vessel.

In one aspect, a system is described herein, the system including a loading station that receives a barrel from a storage area, a heating station that receives the barrel from the loading station and heats the barrel, and a vacuum station that receives the barrel from the heating station and applies a negative pressure to extract liquid from the barrel. In some embodiments, the system can include an unloading station that receives the barrel from the vacuum station. In some embodiments, the loading station, the heating station, and/or the vacuum station can include a slot for access from a fork truck, such that the fork truck can lock into place while loading or unloading the barrel.

DETAILED DESCRIPTION

Embodiments described herein relate to liquid extraction from barrels. Extraction involves application of both heat and a negative pressure to release liquid from pores in a barrel. Alcoholic spirits are aged in naturally porous wooden barrels to impart flavor complexity. In some cases, when wooden barrels are emptied, water is used to soak in the barrel over an extended period of time (i.e., about 6-8 weeks). This extracts additional alcohol out of the wood by use of osmosis. The resulting mixture is about 20 proof, and is primarily used to dilute spirits when desired. In other words, the mixture is used as cut water to proof down spirits, such as bourbon. Such methods involve double handling the barrels. Labor, water, utilities, and storage costs involved in these extraction methods are negative factors to be addressed.

One or more systems and methods described herein can extract the trapped liquid from the barrel without adding additional water or other fluids. Additionally, one or more systems and methods described herein can extract trapped liquid over a relatively short period of time. This can reduce storage expenditures as the barrels can be processed quicker without spending extended amounts of time in storage. A finite volume of any spirit is available to the market coming of age at a given time. By extracting aged spirits from the empty barrel, better yield can be realized.

As used in this specification, "barrel," can include any type of cask, from which liquid can be extracted, including but not limited to English Tun, Gorda, Madeira Drum, Port Pipe, Machine Puncheon, Sherry Shape Puncheon, Sherry Butt, Barrique (Cognac type), Barrique (Bordeux type), Hogshead, British Brewery Barrel, American Standard Barrel, kilderkin, quarter cask, blood tub, firkin, pin, minipin, and/or barracoon.

Barrels described herein are empty during extraction. As used herein, "empty," when used in reference to a barrel, can refer to a barrel with less than about 50 mL, less than about 45 mL, less than about 40 mL, less than about 35 mL, less than about 30 mL, less than about 25 mL, less than about 20 mL, less than about 15 mL, less than about 10 mL, less than about 9 mL, less than about 8 mL, less than about 7 mL, less than about 6 mL, less than about 5 mL, less than about 4 mL, less than about 3 mL, less than about 2 mL, or less than about 1 mL of free liquid.

As used in this specification, "free liquid" refers to liquid that can freely flow around the inside of a barrel at room temperature and atmospheric pressure.

As used in this specification, "trapped liquid" refers to liquid soaked into the wood of a barrel (i.e., the pores of the barrel) at room temperature and atmospheric pressure. In other words, it refers to liquid that does not freely flow around the barrel at room temperature and atmospheric pressure.

As used in this specification, the singular forms "a," "an," and "the" include plural referents unless the context clearly dictates otherwise. Thus, for example, the term "a member" is intended to mean a single member or a combination of members, "a material" is intended to mean one or more materials, or a combination thereof.

The term "substantially" when used in connection with "cylindrical," "linear," and/or other geometric relationships is intended to convey that the structure so defined is nominally cylindrical, linear or the like. As one example, a portion of a support member that is described as being "substantially linear" is intended to convey that, although linearity of the portion is desirable, some non-linearity can occur in a "substantially linear" portion. Such non-linearity can result from manufacturing tolerances, or other practical considerations (such as, for example, the pressure or force applied to the support member). Thus, a geometric construction modified by the term "substantially" includes such geometric properties within a tolerance of plus or minus 5% of the stated geometric construction. For example, a "substantially linear" portion is a portion that defines an axis or center line that is within plus or minus 5% of being linear.

As used herein, the term "set" and "plurality" can refer to multiple features or a singular feature with multiple parts. Thus, a set of portions or a plurality of portions may include multiple portions that are either continuous or discontinuous from each other. A plurality of particles or a plurality of materials can also be fabricated from multiple items that are produced separately and are later joined together (e.g., via mixing, an adhesive, or any suitable method).

Figure 1:
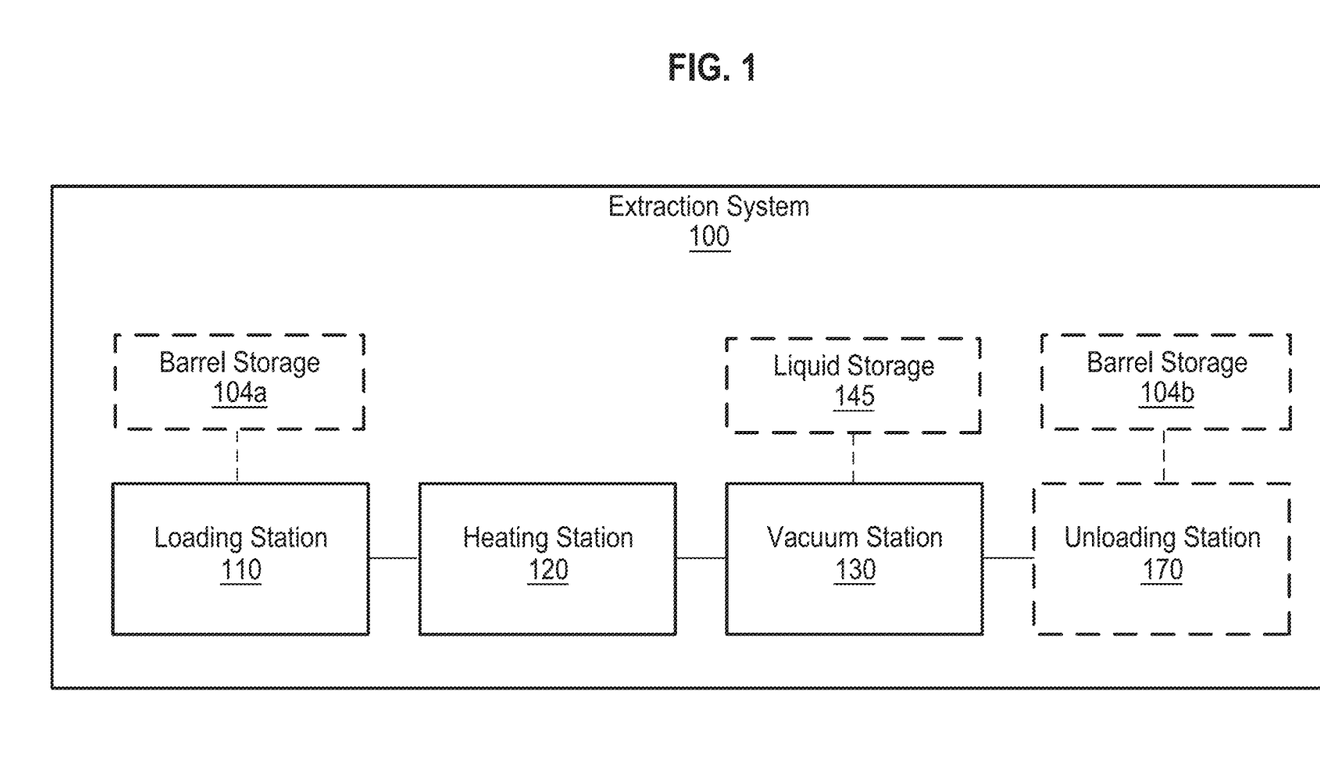
FIG. 1 is a block diagram of an extraction system, according to an embodiment.

FIG. 1 is a block diagram of an extraction system 100, according to an embodiment. As shown, the extraction system 100 includes a loading station 110, a heating station 120, and a vacuum station 130. In some implementations, the extraction system 100 can include an unloading station 170. In some implementations, barrels can be fed to the loading station 110 from barrel storage 104a. In some implementations, barrels can be fed from the unloading station 170 to barrel storage 104b. In some implementations, liquid can be transported from the vacuum station 130 to a storage volume 145 (as referred to herein as a liquid storage volume). In some implementations, the loading station 110, the heating station 120, the vacuum station 130, and/or the unloading station 170 can be organized in an assembly line setting. In other words, barrels can move through each of the stations to have the appropriate processing done to the barrels.

In some implementations, the barrels can be transported manually (e.g., via rolling by hand) from one station to the next. In some implementations, the barrels can be transported by machine (e.g., forklift) (not shown). In some implementations, the barrels can be transferred by an automated transfer line (not shown). In some implementations, the barrels can be transferred via rim roll. In some implementations, the barrels can move via a conveyor device (not shown). In some implementations, movement of the barrels from one station to the next can be controlled via a controller and/or a user interface (not shown).

During extraction, a barrel is loaded in the loading station 110. The loading station 110 includes an area for placement of the barrel. In some implementations, the loading station 110 can include a platform placed on the ground. In some implementations, the barrel can be retrieved from the barrel storage 104a prior to being placed in the loading station 110. In some implementations, the barrel storage 104a can include a storage space for barrels that have been recently emptied. In some implementations, the barrels can have a low residence time at the barrel storage 104a. In some implementations, barrels can have a residence time at the barrel storage of less than about 2 weeks, less than about 1 week, less than about 6 days, less than about 5 days, less than about 4 days, less than about 3 days, less than about 2 days, less than about 1 day, less than about 20 hours, less than about 15 hours, less than about 10 hours, less than about 9 hours, less than about 8 hours, less than about 7 hours, less than about 6 hours, less than about 5 hours, less than about 4 hours, less than about 3 hours, less than about 2 hours, or less than about 1 hour, inclusive of all values and ranges therebetween. In some implementations, the barrel can be placed in the loading station 110 by hand. In some implementations, the barrel can be placed in the loading station 110 by forklift, conveyor, rim roll, or any other suitable placement mechanism.

The barrel is heated at the heating station 120 to open and expand the pores of the barrel. In some implementations, the heating station 120 can include an oven. In some implementations, heat can be applied at the heating station 120 via convection, conduction, radiation, microwave radiation, or any other suitable heat delivery method, or combinations thereof. In some implementations, the oven can include a low heat oven. In some implementations, the heating station 120 can include a dehumidifier to prevent the water from diluting the trapped liquid. In some implementations, the heating station 120 can be maintained at a relative humidity of less than about 20%, less than about 19%, less than about 18%, less than about 17%, less than about 16%, less than about 15%, less than about 14%, less than about 13%, less than about 12%, less than about 11%, less than about 10%, less than about 9%, less than about 8%, less than about 7%, less than about 6%, or less than about 5%, inclusive of all values and ranges therebetween. In some implementations, the oven can be powered via electricity, gas, renewables (solar, wind), or any combination thereof.

In some implementations, the oven can be sized such that the barrel can move slowly though the oven (e.g., at a constant rate of movement) and spend the desired residence time in the oven, such that its temperature increases to a desired level. For example, the barrel can move through the oven at 1 meter per minute and spend a desired time of 5 minutes in the oven if the oven is sized to be 5 meters long along the movement path of the barrel. In some implementations, the oven can have a length along the path of the barrel of at least about 1 m, at least about 1.5 m, at least about 2 m, at least about 2.5 m, at least about 3 m, at least about 3.5 m, at least about 4 m, at least about 4.5 m, at least about 5 m, at least about 5.5 m, at least about 6 m, at least about 6.5 m, at least about 7 m, at least about 7.5 m, at least about 8 m, at least about 8.5 m, at least about 9 m, or at least about 9.5 m. In some implementations, the oven can have a length along the path of the barrel of no more than about 10 m, no more than about 9.5 m, no more than about 9 m, no more than about 8.5 m, no more than about 8 m, no more than about 7.5 m, no more than about 7 m, no more than about 6.5 m, no more than about 6 m, no more than about 5.5 m, no more than about 5 m, no more than about 4.5 m, no more than about 4 m, no more than about 3.5 m, no more than about 3 m, no more than about 2.5 m, no more than about 2 m, or no more than about 1.5 m.

In some implementations, the heating station 120 can include a heating blanket (not shown). In some embodiments, the heating blanket can be wrapped around the barrel and removed from the barrel via an automated process. For example, the heating blanket can be on the ground, and the barrel can roll onto the blanket and a portion of the barrel can lock onto the leading edge of the blanket and continue to roll, such that the blanket wraps around the barrel. In some implementations, the heating blanket can be electronically powered. In some implementations, the heating blanket can have built in safety mechanisms (not shown), such as a timer and/or a maximum temperature setting. In some implementations, the heating station 120 can include both an oven and a heating blanket.

At the vacuum station 130, a negative pressure is applied to the barrel to draw out the trapped liquid. The extracted liquid flows out of the barrel (e.g., via the bung hole of the barrel). The vacuum station 130 includes a negative pressure chamber. In some implementations, the vacuum station 130 can include a collection pan and/or a funnel for collection of liquid that is extracted from the barrel. In some embodiments, the negative pressure chamber can be fluidically coupled to the storage volume 145 (e.g., via a tube). The storage volume 145 can include a vessel (e.g., a tank) to store liquid captured from the vacuum station 130. In some implementations, the liquid storage volume 145 can include a container completely separate from the vacuum station 130. In some implementations the liquid storage volume 145 can include a container completely separate from the negative pressure chamber. In some implementations, the negative pressure chamber can be absent of any vents that would equalize the pressure between the inside and the outside of the negative pressure chamber. In some implementations, the negative pressure chamber can be absent of any heating or cooling devices.

In some implementations, the storage volume 145 can have a volume of at least about 10 L, at least about 20 L, at least about 30 L, at least about 40 L, at least about 50 L, at least about 60 L, at least about 70 L, at least about 80 L, at least about 90 L, at least about 100 L, at least about 200 L, at least about 300 L, at least about 400 L, at least about 500 L, at least about 600 L, at least about 700 L, at least about 800 L, at least about 900 L, at least about 1 m$^3$, at least about 2 m$^3$, at least about 3 m$^3$, at least about 4 m$^3$, at least about 5 m$^3$, at least about 6 m$^3$, at least about 7 m$^3$, at least about 8 m$^3$, or at least about 9 m$^3$. In some implementations, the storage volume 145 can have a volume of no more than about 10 m$^3$, no more than about 9 m$^3$, no more than about 8 m$^3$, no more than about 7 m$^3$, no more than about 6 m$^3$, no more than about 5 m$^3$, no more than about 4 m$^3$, no more than about 3 m$^3$, no more than about 2 m$^3$, no more than about 1 m$^3$, no more than about 900 L, no more than about 800 L, no more than about 700 L, no more than about 600 L, no more than about 500 L, no more than about 400 L, no more than about 300 L, no more than about 200 L, no more than about 100 L, no more than about 90 L, no more than about 80 L, no more than about 70 L, no more than about 60 L, no more than about 50 L, no more than about 40 L, no more than about 30 L, or no more than about 20 L.

The unloading station 170 is optional and includes an area for removal of the barrel. In some implementations, the unloading station 170 can include a platform at the end of the assembly line. The barrel can be removed from the unloading station 170 and placed in the barrel storage 104b. The barrel storage 104b can store barrels that have had their trapped liquid extracted. In some implementations, the barrel storage 104b can be in close proximity to the barrel storage 104a. In some implementations, the barrel storage 104a can be in the same facility as the barrel storage 104a.

Figure 2:
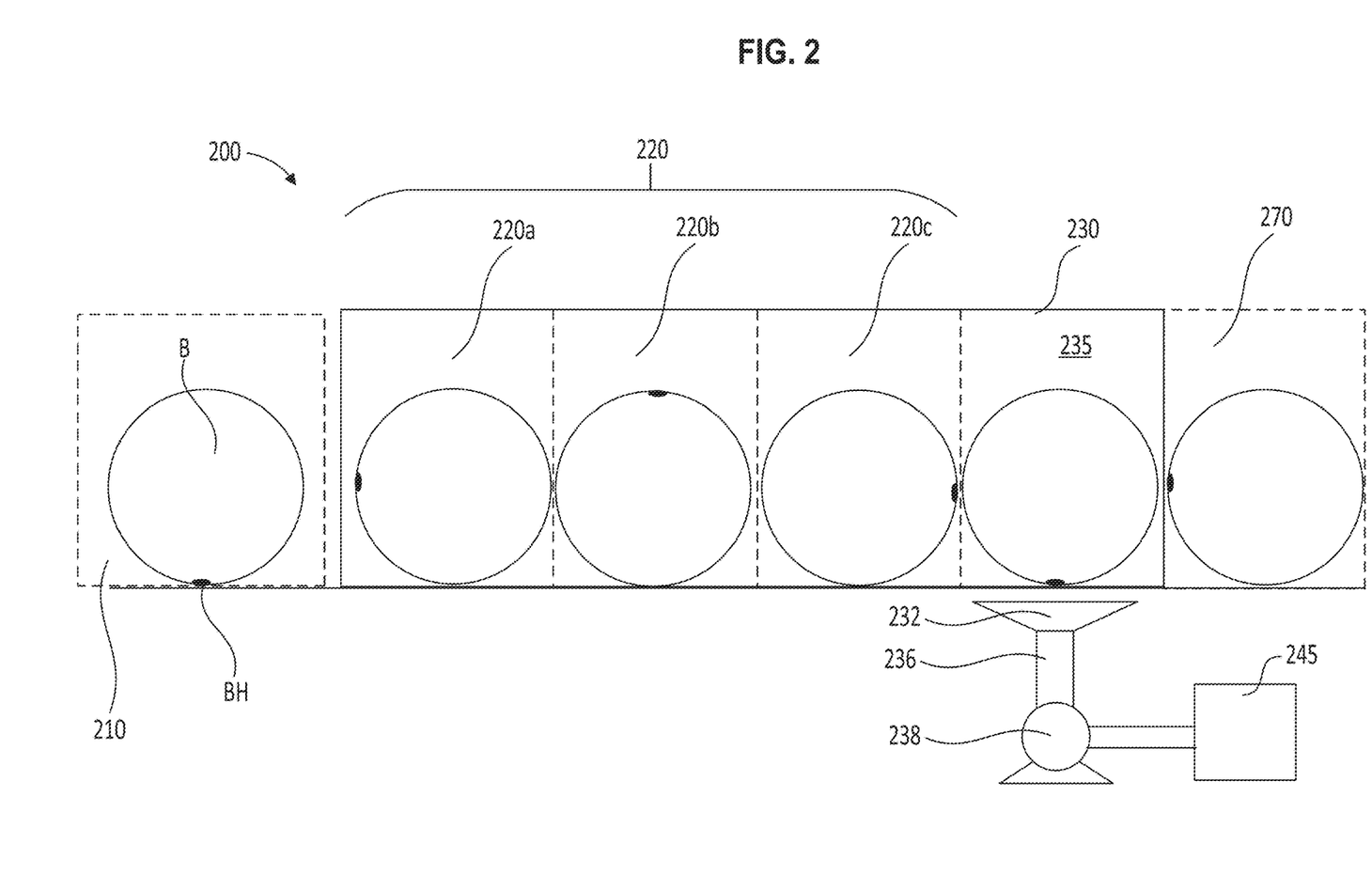
FIG. 2 is an illustration of an extraction system with a barrel at various stations therein, according to an embodiment.

FIG. 2 shows an illustration of an extraction system 200. As shown, the extraction system 200 includes a loading station 210, a heating station 220, a vacuum station 230, and an unloading station 270. The heating station 220 includes substations 220a, 220b, 220c. The vacuum station 230 includes a funnel 232, a negative pressure chamber 235, a tube 236, a pump 238, and a storage volume 245 (i.e., a liquid storage volume). In some implementations, the loading station 210, the heating station 220, the vacuum station 230, the storage volume 245, and the unloading station 270 can be the same or substantially similar to loading station 110, the heating station 120, the vacuum station 130, the storage volume 145, and the unloading station 170, respectively, as described above with reference to FIG. 1. Thus, certain aspects of the loading station 210, the heating station 220, the vacuum station 230, the storage volume 245, and the unloading station 270 are not described in greater detail herein. The extraction system 200 is oriented, such that a barrel B can roll on the floor (or the ground) from one station to the next. In some embodiments, the loading station 210, the heating station 220, the vacuum station 230, and/or the unloading station 270 can include a slot for access from a fork truck, such that the fork truck can lock into place while loading or unloading the barrel. For example, an oven can be included in the heating station 220, and the oven can include a slot for access from a fork truck, such that the fork truck can lock into place on the oven and deliver the barrel to the appropriate location in the oven.

The barrel B is loaded into the loading station 210 prior to moving into the subsequent stations of the extraction system 200. In some implementations, the loading station 210 can include rails for placement of the barrel B. As shown, the barrel B includes a bung hole BH and the barrel B is placed in the loading station 210 with the bung hole BH facing downward. In some implementations, the barrel B can be placed with the bung hole BH facing upward. In some implementations, the barrel B can be placed with the bung hole BH facing to the side or at an angle relative to facing downward.

As shown, the heating station 220 includes subsections 220a, 220b, 220c. The barrel B rolls through each of the subsections 220a, 220b, 220c. As shown, the heating station 220 is sized such that the barrel B completes a full rotation within the heating station 220. In some implementations, the heating station 220 can be sized such that the barrel B completes at least about 0.25 rotations, at least about 0.5 rotations, at least about 0.75 rotations, at least about 1 rotation, at least about 1.25 rotations, at least about 1.5 rotations, at least about 1.75 rotations, at least about 2 rotations, at least about 2.25 rotations, at least about 2.5 rotations, at least about 2.75 rotations, at least about 3 rotations, at least about 3.25 rotations, at least about 3.5 rotations, or at least about 3.75 rotations during rolling through the heating station 220. In some implementations, the heating station 220 can be sized such that the barrel B completes no more than about 4 rotations, no more than about 3.75 rotations, no more than about 3.5 rotations, no more than about 3.25 rotations, no more than about 3 rotations, no more than about 2.75 rotations, no more than about 2.5 rotations, no more than about 2.25 rotations, no more than about 2 rotations, no more than about 1.75 rotations, no more than about 1.5 rotations, no more than about 1.25 rotations, no more than about 1 rotation, no more than about 0.75 rotations, or no more than about 0.5 rotations. Combinations of the above-referenced numbers of rotations are also possible (e.g., at least about 0.25 rotations and no more than about 4 rotations or at least about 1 rotation and no more than about 3 rotations), inclusive of all values and ranges therebetween. In some implementations, the heating station 220 can be sized such that the barrel B completes about 0.25 rotations, about 0.5 rotations, about 0.75 rotations, about 1 rotation, about 1.25 rotations, about 1.5 rotations, about 1.75 rotations, about 2 rotations, about 2.25 rotations, about 2.5 rotations, about 2.75 rotations, about 3 rotations, about 3.25 rotations, about 3.5 rotations, about 3.75 rotations, or about 4 rotations during rolling through the heating station 220.

In some implementations, the heating station 220 can be sized such that the barrel B is placed into the heating station 220 in a batch process. In other words, the heating station 220 can be sized such that a user can place the barrel B or multiple barrels into the heating station 220 and remove the barrel(s) from the heating station 220 after completion of the heating process. In some implementations, the barrel B can have a residence time in the heating station 220 of at least about 30 seconds, at least about 40 seconds, at least about 50 seconds, at least about 1 minute, at least about 2 minutes, at least about 3 minutes, at least about 4 minutes, at least about 5 minutes, at least about 6 minutes, at least about 7 minutes, at least about 8 minutes, at least about 9 minutes, at least about 10 minutes, at least about 15 minutes, at least about 20 minutes, at least about 25 minutes, at least about 30 minutes, at least about 35 minutes, at least about 40 minutes, at least about 45 minutes, at least about 50 minutes, or at least about 55 minutes. In some implementations, the barrel B can have a residence time in the heating station 220 of no more than about 60 minutes, no more than about 55 minutes, no more than about 50 minutes, no more than about 45 minutes, no more than about 40 minutes, no more than about 35 minutes, no more than about 30 minutes, no more than about 25 minutes, no more than about 20 minutes, no more than about 155 minutes, no more than about 10 minutes, no more than about 9 minutes, no more than about 8 minutes, no more than about 7 minutes, no more than about 6 minutes, no more than about 5 minutes, no more than about 4 minutes, no more than about 3 minutes, no more than about 2 minutes, no more than about 1 minute, no more than about 50 seconds, or no more than about 40 seconds. Combinations of the above-referenced residence times are also possible (e.g., at least about 30 seconds and no more than about 60 minutes or at least about 5 minutes and no more than about 20 minutes), inclusive of all values and ranges therebetween. In some implementations, the barrel B can have a residence time in the heating station 220 of about 30 seconds, about 40 seconds, about 50 seconds, about 1 minute, about 2 minutes, about 3 minutes, about 4 minutes, about 5 minutes, about 6 minutes, about 7 minutes, about 8 minutes, about 9 minutes, about 10 minutes, about 15 minutes, about 20 minutes, about 25 minutes, about 30 minutes, about 35 minutes, about 40 minutes, about 45 minutes, about 50 minutes, about 55 minutes, or about 60 minutes.

In some implementations, the barrel B can rotate at least about 0.1, at least about 0.2, at least about 0.3, at least about 0.4, at least about 0.5, at least about 0.6, at least about 0.7, at least about 0.8, at least about 0.9, at least about 1, at least about 1.5, at least about 2, at least about 2.5, at least about 3, at least about 3.5, at least about 4, or at least about 4.5 full rotations in the heating station 220. In some implementations, the barrel B can rotate no more than about 5, no more than about 4.5, no more than about 4, no more than about 3.5, no more than about 3, no more than about 2.5, no more than about 2, no more than about 1.5, no more than about 1, no more than about 0.9, no more than about 0.8, no more than about 0.7, no more than about 0.6, no more than about 0.5, no more than about 0.4, no more than about 0.3, or no more than about 0.2 full rotations in the heating station 220. Combinations of the above-referenced numbers of rotations are also possible (e.g., at least about 0.1 and no more than about 5 or at least about 0.5 and no more than about 0.5), inclusive of all values and ranges therebetween. In some implementations, the barrel B can rotate about 0.1, about 0.2, about 0.3, about 0.4, about 0.5, about 0.6, about 0.7, about 0.8, about 0.9, about 1, about 1.5, about 2, about 2.5, about 3, about 3.5, about 4, about 4.5, or about 5 full rotations in the heating station 220.

The vacuum station 230 includes the funnel 232, the negative pressure chamber 235, the tube 236, the pump 238, and the storage volume 245. The negative pressure chamber 235 draws a negative pressure to extract liquid from the barrel B. The barrel B can be placed in the negative pressure chamber 235, such that the bung hole BH points downward, or at an angle of less than about 90 degrees relative to pointing downward. In some implementations, the negative pressure chamber 235 can be sized to hold multiple barrels. In some implementations, the negative pressure chamber 235 can be sized to hold at least about 1, at least about 2, at least about 3, at least about 4, at least about 5, at least about 6, at least about 7, at least about 8, at least about 9, at least about 10, at least about 20, at least about 30, at least about 40, at least about 50, at least about 60, at least about 70, at least about 80, or at least about 90 barrels. In some implementations, the negative pressure chamber 235 can be sized to hold no more than about 100 barrels, no more than about 90 barrels, no more than about 80 barrels, no more than about 70 barrels, no more than about 60 barrels, no more than about 50 barrels, no more than about 40 barrels, no more than about 30 barrels, no more than about 20 barrels, no more than about 10 barrels, no more than about 9 barrels, no more than about 8 barrels, no more than about 7 barrels, no more than about 6 barrels, no more than about 5 barrels, no more than about 4 barrels, no more than about 3 barrels, or no more than about 2 barrels. Combinations of the above-referenced barrel capacities are also possible (e.g., at least about 1 barrel and no more than about 100 barrels or at least about 10 barrels and no more than about 50 barrels), inclusive of all values and ranges therebetween. In some implementations, the negative pressure chamber 235 can be sized to hold about 1, about 2, about 3, about 4, about 5, about 6, about 7, about 8, about 9, about 10, about 20, about 30, about 40, about 50, about 60, about 70, about 80, about 90 barrels, or about 100 barrels.

In some implementations, the negative pressure chamber 235 can have a volume of at least about 1 m$^3$, at least about 2 m$^3$, at least about 3 m$^3$, at least about 4 m$^3$, at least about 5 m$^3$, at least about 6 m$^3$, at least about 7 m$^3$, at least about 8 m$^3$, at least about 9 m$^3$, at least about 10 m$^3$, at least about 10 m$^3$, at least about 20 m$^3$, at least about 30 m$^3$, at least about 40 m$^3$, at least about 50 m$^3$, at least about 60 m$^3$, at least about 70 m$^3$, at least about 80 m$^3$, at least about 90 m$^3$, at least about 100 m$^3$, at least about 150 m$^3$, at least about 200 m$^3$, at least about 250 m$^3$, at least about 300 m$^3$, at least about 350 m$^3$, at least about 400 m$^3$, or at least about 450 m$^3$. In some implementations, the negative pressure chamber 235 can have a volume of no more than about 500 m$^3$, no more than about 450 m$^3$, no more than about 400 m$^3$, no more than about 350 m$^3$, no more than about 300 m$^3$, no more than about 250 m$^3$, no more than about 200 m$^3$, no more than about 150 m$^3$, no more than about 100 m$^3$, no more than about 90 m$^3$, no more than about 80 m$^3$, no more than about 70 m$^3$, no more than about 60 m$^3$, no more than about 50 m$^3$, no more than about 40 m$^3$, no more than about 30 m$^3$, no more than about 20 m$^3$, no more than about 10 m$^3$, no more than about 9 m$^3$, no more than about 8 m$^3$, no more than about 7 m$^3$, no more than about 6 m$^3$, no more than about 5 m$^3$, no more than about 4 m$^3$, no more than about 3 m$^3$, or no more than about 2 m$^3$. Combinations of the above-referenced volumes are also possible (e.g., at least about 1 m$^3$ and no more than about 500 m$^3$ or at least about 10 m$^3$ and no more than about 50 m$^3$), inclusive of all values and ranges therebetween. In some implementations, the negative pressure chamber 235 can have a volume of about 1 m$^3$, about 2 m$^3$, about 3 m$^3$, about 4 m$^3$, about 5 m$^3$, about 6 m$^3$, about 7 m$^3$, about 8 m$^3$, about 9 m$^3$, about 10 m$^3$, about 10 m$^3$, about 20 m$^3$, about 30 m$^3$, about 40 m$^3$, about 50 m$^3$, about 60 m$^3$, about 70 m$^3$, about 80 m$^3$, about 90 m$^3$, about 100 m$^3$, about 150 m$^3$, about 200 m$^3$, about 250 m$^3$, about 300 m$^3$, about 350 m$^3$, about 400 m$^3$, about 450 m$^3$, or about 500 m$^3$.

In some implementations, the barrel B can have a residence time in the negative pressure chamber 235 of at least about 30 seconds, at least about 40 seconds, at least about 50 seconds, at least about 1 minute, at least about 2 minutes, at least about 3 minutes, at least about 4 minutes, at least about 5 minutes, at least about 6 minutes, at least about 7 minutes, at least about 8 minutes, at least about 9 minutes, at least about 10 minutes, at least about 20 minutes, at least about 30 minutes, at least about 40 minutes, at least about 50 minutes, at least about 1 hour, at least about 1.5 hours, at least about 2 hours, at least about 2.5 hours, at least about 3 hours, at least about 3.5 hours, at least about 4 hours, at least about 4.5 hours, at least about 5 hours, at least about 5.5 hours, at least about 6 hours, at least about 6.5 hours, at least about 7 hours, at least about 7.5 hours, at least about 8 hours, at least about 8.5 hours, at least about 9 hours, or at least about 9.5 hours. In some implementations, the barrel B can have a residence time in the negative pressure chamber 235 of no more than about 10 hours, no more than about 9.5 hours, no more than about 9 hours, no more than about 8.5 hours, no more than about 8 hours, no more than about 7.5 hours, no more than about 7 hours, no more than about 6.5 hours, no more than about 6 hours, no more than about 5.5 hours, no more than about 5 hours, no more than about 4.5 hours, no more than about 4 hours, no more than about 3.5 hours, no more than about 3 hours, no more than about 2.5 hours, no more than about 2 hours, no more than about 1.5 hours, no more than about 1 hour, no more than about 50 minutes, no more than about 40 minutes, no more than about 30 minutes, no more than about 20 minutes, no more than about 10 minutes, no more than about 9 minutes, no more than about 8 minutes, no more than about 7 minutes, no more than about 6 minutes, no more than about 5 minutes, no more than about 4 minutes, no more than about 3 minutes, no more than about 2 minutes, no more than about 1 minute, no more than about 50 seconds or no more than about 40 seconds.

Combinations of the above-referenced residence times of the barrel in the negative pressure chamber 235 are also possible (e.g., at least about 30 seconds and no more than about 10 hours or at least about 5 minutes and no more than about 30 minutes), inclusive of all values and ranges therebetween. In some implementations, the barrel B can have a residence time in the negative pressure chamber 235 of about 30 seconds, about 40 seconds, about 50 seconds, about 1 minute, about 2 minutes, about 3 minutes, about 4 minutes, about 5 minutes, about 6 minutes, about 7 minutes, about 8 minutes, about 9 minutes, about 10 minutes, about 20 minutes, about 30 minutes, about 40 minutes, about 50 minutes, about 1 hour, about 1.5 hours, about 2 hours, about 2.5 hours, about 3 hours, about 3.5 hours, about 4 hours, about 4.5 hours, about 5 hours, about 5.5 hours, about 6 hours, about 6.5 hours, about 7 hours, about 7.5 hours, about 8 hours, about 8.5 hours, about 9 hours, about 9.5 hours, or about 10 hours.

In some implementations, the negative pressure chamber 235 can be depressurized to a pressure of less than (i.e., more negative than) about −0.01 bar gauge, less than about −0.02 bar gauge, less than about −0.03 bar gauge, less than about −0.04 bar gauge, less than about −0.05 bar gauge, less than about −0.06 bar gauge, less than about −0.07 bar gauge, less than about −0.08 bar gauge, less than about −0.09 bar gauge, less than about −0.1 bar gauge, less than about −0.15 bar gauge, less than about −0.2 bar gauge, less than about −0.25 bar gauge, less than about −0.3 bar gauge, less than about −0.35 bar gauge, less than about −0.4 bar gauge, less than about −0.45 bar gauge, less than about −0.5 bar gauge, less than about −0.55 bar gauge, less than about −0.6 bar gauge, less than about −0.65 bar gauge, less than about −0.7 bar gauge, less than about −0.75 bar gauge, less than about −0.8 bar gauge, less than about −0.85 bar gauge, less than about −0.9 bar gauge, less than about −0.95 bar gauge, or less than about −1 bar gauge. In some implementations, the negative pressure chamber 235 can be depressurized to a pressure of no less than (i.e., no more negative than) about −1.05 bar gauge, no less than about −1 bar gauge, no less than about −0.95 bar gauge, no less than about −0.9 bar gauge, no less than about −0.85 bar gauge, no less than about −0.8 bar gauge, no less than about −0.75 bar gauge, no less than about −0.7 bar gauge, no less than about −0.65 bar gauge, no less than about −0.6 bar gauge, no less than about −0.55 bar gauge, no less than about −0.5 bar gauge, no less than about −0.45 bar gauge, no less than about −0.4 bar gauge, no less than about −0.35 bar gauge, no less than about −0.3 bar gauge, no less than about −0.25 bar gauge, no less than about −0.2 bar gauge, no less than about −0.15 bar gauge, no less than about −0.1 bar gauge, no less than about −0.09 bar gauge, no less than about −0.08 bar gauge, no less than about −0.07 bar gauge, no less than about −0.06 bar gauge, no less than about −0.05 bar gauge, no less than about −0.04 bar gauge, no less than about −0.03 bar gauge, or no less than about −0.02 bar gauge. Combinations of the above-referenced pressures are also possible (e.g., less than about −0.01 bar gauge and no more than about −1.05 bar gauge or less than about −0.1 bar gauge and no more than about −0.5 bar gauge), inclusive of all values and ranges therebetween. In some implementations, the negative pressure chamber 235 can be depressurized to a pressure of less than (i.e., more negative than) about −0.01 bar gauge, about −0.02 bar gauge, about −0.03 bar gauge, about −0.04 bar gauge, about −0.05 bar gauge, about −0.06 bar gauge, about −0.07 bar gauge, about −0.08 bar gauge, about −0.09 bar gauge, about −0.1 bar gauge, about −0.15 bar gauge, about −0.2 bar gauge, about −0.25 bar gauge, about −0.3 bar gauge, about −0.35 bar gauge, about −0.4 bar gauge, about −0.45 bar gauge, about −0.5 bar gauge, about −0.55 bar gauge, about −0.6 bar gauge, about −0.65 bar gauge, about −0.7 bar gauge, about −0.75 bar gauge, about −0.8 bar gauge, about −0.85 bar gauge, about −0.9 bar gauge, about −0.95 bar gauge, about −1 bar gauge, or about −1.05 bar gauge.

In some implementations, the negative pressure chamber 235 can be depressurized to a pressure of at least about 0 bar absolute, at least about 0.05 bar absolute, at least about 0.1 bar absolute, at least about 0.15 bar absolute, at least about 0.2 bar absolute, at least about 0.25 bar absolute, at least about 0.3 bar absolute, at least about 0.35 bar absolute, at least about 0.4 bar absolute, at least about 0.45 bar absolute, at least about 0.5 bar absolute, at least about 0.55 bar absolute, at least about 0.6 bar absolute, at least about 0.65 bar absolute, at least about 0.7 bar absolute, at least about 0.75 bar absolute, at least about 0.8 bar absolute, at least about 0.85 bar absolute, at least about 0.9 bar absolute, at least about 0.91 bar absolute, at least about 0.92 bar absolute, at least about 0.93 bar absolute, at least about 0.94 bar absolute, at least about 0.95 bar absolute, at least about 0.96 bar absolute, at least about 0.97 bar absolute, at least about 0.98 bar absolute, at least about 0.99 bar absolute, or at least about 1 bar absolute. In some implementations, the negative pressure chamber 235 can be depressurized to a pressure of no more than about 1.05 bar absolute, no more than about 1 bar absolute, no more than about 0.99 bar absolute, no more than about 0.98 bar absolute, no more than about 0.97 bar absolute, no more than about 0.96 bar absolute, no more than about 0.95 bar absolute, no more than about 0.94 bar absolute, no more than about 0.93 bar absolute, no more than about 0.92 bar absolute, no more than about 0.91 bar absolute, no more than about 0.9 bar absolute, no more than about 0.85 bar absolute, no more than about 0.8 bar absolute, no more than about 0.75 bar absolute, no more than about 0.7 bar absolute, no more than about 0.65 bar absolute, no more than about 0.6 bar absolute, no more than about 0.55 bar absolute, no more than about 0.5 bar absolute, no more than about 0.45 bar absolute, no more than about 0.4 bar absolute, no more than about 0.35 bar absolute, no more than about 0.3 bar absolute, no more than about 0.25 bar absolute, no more than about 0.2 bar absolute, no more than about 0.15 bar absolute, no more than about 0.1 bar absolute, or no more than about 0.05 bar absolute. Combinations of the above-referenced pressure ranges are also possible (e.g., at least about 0 bar absolute and no more than about 1.05 bar absolute or at least about 0.2 bar absolute and no more than about 0.6 bar absolute), inclusive of all values and ranges therebetween. In some implementations, the negative pressure chamber 235 can be depressurized to a pressure of about 0 bar absolute, about 0.05 bar absolute, about 0.1 bar absolute, about 0.15 bar absolute, about 0.2 bar absolute, about 0.25 bar absolute, about 0.3 bar absolute, about 0.35 bar absolute, about 0.4 bar absolute, about 0.45 bar absolute, about 0.5 bar absolute, about 0.55 bar absolute, about 0.6 bar absolute, about 0.65 bar absolute, about 0.7 bar absolute, about 0.75 bar absolute, about 0.8 bar absolute, about 0.85 bar absolute, about 0.9 bar absolute, about 0.91 bar absolute, about 0.92 bar absolute, about 0.93 bar absolute, about 0.94 bar absolute, about 0.95 bar absolute, about 0.96 bar absolute, about 0.97 bar absolute, about 0.98 bar absolute, about 0.99 bar absolute, about 1 bar absolute, or about 1.05 bar absolute.

The funnel 232 collects liquid from the barrel B. The funnel 232 can be positioned such that it is under the bung hole BH. In some implementations, the funnel 232 can be sized such that it can collect the liquid dripping from multiple barrels B. As shown, the funnel 232 is placed outside of the negative pressure chamber 235. In some implementations, the funnel 232 can be placed inside the negative pressure chamber 235. In some implementations, the funnel 232 can be integrated into the floor of the negative pressure chamber 235. In some implementations, the funnel 232 can act as a collection plate or a drip pan to collect liquid that drips from the barrel B.

The tube 236 is fluidically coupled to the funnel 232 and carries liquid from the funnel 232 to the storage volume 245. In some implementations, when the funnel 232 is inside the negative pressure chamber 235, the tube 236 can transport liquid from the inside of the negative pressure chamber 235 to the outside of the negative pressure chamber 235. In some implementations, the tube 236 can be composed of a vinyl, polyvinyl chloride (PVC), polyurethane, thermoplastic, polyvinylidene fluoride (PVDF), Tygon®, steel, stainless steel, carbon steel, alloy steel, or any combination thereof. In some implementations, the tube 236 can be transparent (e.g., to aid in the observation/confirmation of liquid being extracted from the barrel B). The pump 238 can aid in advancing the liquid through the tube 236, facilitating liquid from inside the negative pressure chamber 235 to the storage volume 245. In some implementations, the pump 238 can include a centrifugal pump, a lobe pump, a self-priming centrifugal pump, a rotary gear pump, a horizonal split case pump, a metering/dosing pump, an air operated pump, or any combination thereof. In some implementations, the extraction system 200 can be absent of any positive pressure vessels or devices that induce a positive pressure.

Figure 3:
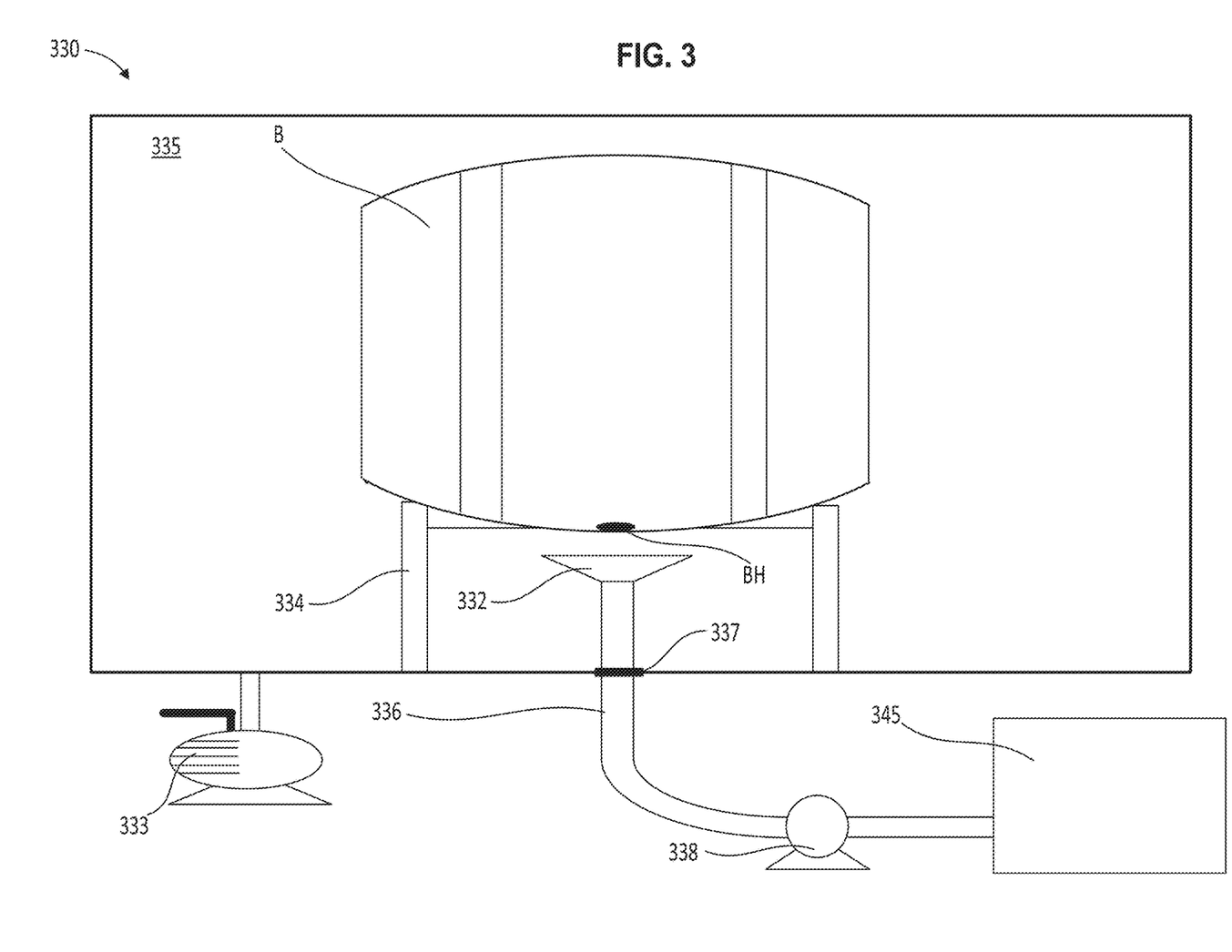
FIG. 3 is an illustration of a vacuum station, according to an embodiment.

FIG. 3 shows a vacuum station 330, according to an embodiment. As shown, the vacuum station 330 includes a negative pressure chamber 335, a funnel 332, a vacuum pump 333, a base frame 334, a tube 336, a gasket 337, a pump 338, and a storage volume 345 (i.e., a liquid storage volume). In some implementations, the funnel 332, the pressure chamber 335, the tube 336, the pump 338, and the storage volume 345 can be the same or substantially similar to the funnel 232, the pressure chamber 235, the tube 236, the pump 238, and the storage volume 245, respectively, as described above with reference to FIG. 2. Thus, certain aspects of the funnel 332, the pressure chamber 335, the tube 336, the pump 338, and the storage volume 345 are not described in greater detail herein.

In some implementations, the negative pressure chamber 335 can include a door (not shown). The barrel B can enter and exit the negative pressure chamber 335 through the door. In some implementations, the negative pressure chamber 335 can include a first door and a second door (e.g., the second door can be opposite the first door). The barrel B can enter the negative pressure chamber 335 through the first door and exit the negative pressure chamber 335 through the second door. In some implementations, the second door can be located opposite the first door, such that the barrel B can move (e.g., via rolling) in the same direction to exit the negative pressure chamber 335 as it did to enter the negative pressure chamber 335. In some implementations, the barrel B can be conveyed into and out of the negative pressure chamber 335 by rolling the barrel B on rails into and out of the negative pressure chamber 335. For example, the barrel B can roll along a rail that merges with the base frame 334 and roll upward through the first door to get onto the base frame 334 while entering the negative pressure chamber 335. In some implementations, the negative pressure chamber 335 can include a heating implement (not shown). In some implementations, the heating implement can include a radiator, a heating coil, a furnace, a heat pump, or any other suitable heating device. In some implementations, heat can be applied to the barrel B while the barrel B is inside the negative pressure chamber 335. The doors can then be closed and the evacuation can proceed. After the evacuation has completed, the barrel B can roll off of the base frame 334 along the rail and out of the second door. In some implementations, the rail can be removed for the doors to close. In some implementations, the negative pressure chamber 335 can be sized to process a single barrel at a time. Processing a single barrel at a time can allow a more thorough extraction of liquid from the barrel B than processing multiple barrels simultaneously.

As shown, the funnel 332 is separated or spaced apart from the barrel B. In some implementations, the funnel 332 can be directly coupled to the barrel. In some implementations, the funnel 332 can form a seal with the barrel (e.g., via a gasket). The vacuum pump 333 is fluidically connected to the negative pressure chamber 335 such that it removes gas from the negative pressure chamber 335 and applies a negative pressure to the negative pressure chamber 335. In some implementations, the vacuum pump 333 can be operated continuously. In some implementations, the vacuum pump 333 can be operated intermittently.

As shown, the base frame 334 includes a plurality of bars to support the barrel B. The base frame 334 keeps the barrels B elevated for drainage. In some implementations, the bars can be composed of metal, wood, plastic, or any other suitable material or combinations thereof. In some implementations, the bars can be arranged in a rectangular pattern such that they do not block the flow of liquid from the barrel B (e.g., the bung hole BH of the barrel B). In some implementations, the funnel 332 can be placed in a gap between the bars of the base frame 334.

The tube 336 carries liquid from the interior of the negative pressure chamber 335 to the outside of the negative pressure chamber 335. In some implementations, the tube 336 can extend from the inside of the negative pressure chamber 335 to the outside of the pressure chamber 335 via a hole in a wall, a floor, and/or a ceiling of the negative pressure chamber 335. In some implementations, the tube 336 can be directly connected to the barrel B (e.g., bung hole BH of barrel B), such that the funnel 332 is not necessary. In other words, liquid can flow from the barrel B through the tube 336 without any additional instrumentation for catching the fluid. In some implementations, a seal can be formed between the tube 336 and the barrel B (e.g., bung hole BH of barrel B), through which the tube 336 extends (e.g., via the gasket 337). The tube 336 can flow from the inside to the outside of the pressure chamber 335 with the gasket 337 preventing any additional exposure of the inside of the negative pressure chamber 335 to the outside environment. In some implementations, the tube 336 can have a diameter larger than a diameter of the bung hole BH and loosely fit against a surface of the barrel B. In some implementations, the pump 338 can at least partially aid in reducing the pressure in the negative pressure chamber 335. In other words, in addition to transporting the extracted liquid out of the negative pressure chamber 335, the pump 338 can remove gas from the negative pressure chamber 335 and aid in reducing the pressure in the negative pressure chamber 335. In some implementations, the vacuum station 330 can be absent of any device for addition or removal of humidity.

Figure 4:
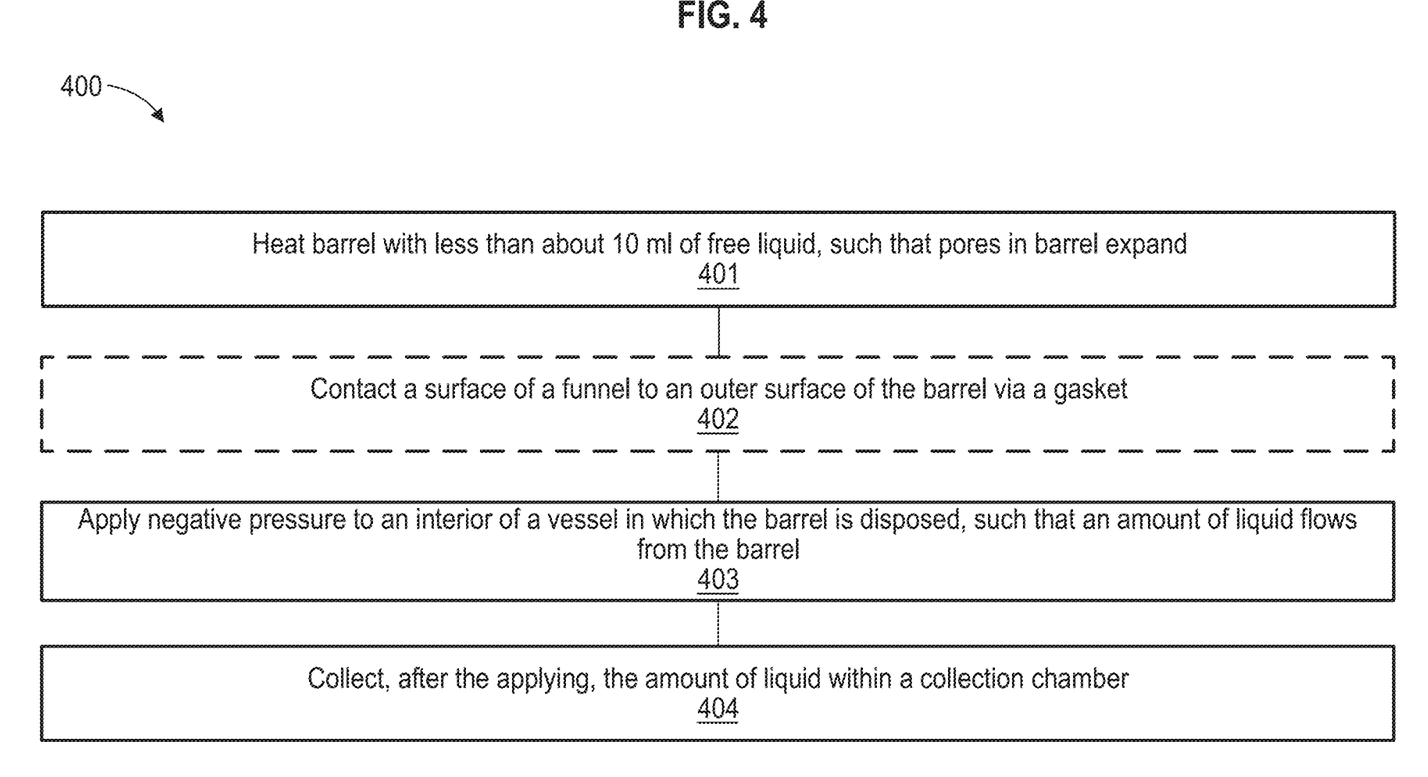
FIG. 4 is a block diagram of a method of extracting liquid from a barrel, according to an embodiment.

FIG. 4 is a block diagram of a method 400 of extracting liquid from a barrel, according to an embodiment. As shown, the method 400 includes at 401 heating a barrel with less than about 10 mL of free liquid, such that pores in the barrel expand. The method 400 optionally includes contacting a surface of a funnel to an outer surface of the barrel via a gasket at 402. At 403, the method 400 includes applying a negative pressure to an interior of a vessel in which the barrel is disposed, such that an amount of liquid flows from the barrel. At 404, the method 400 includes collecting, after the applying, the amount of liquid within a collection chamber. In some implementations, the method 400 can be performed without adding water to the barrel. In some implementations, any of the steps of the method 400 can be implemented via a user interface. In other words, the implementation of the steps can be controlled by a user operating software on a user interface. In some implementations, the user interface can include a computer, a laptop computer, a desktop computer, a tablet, a mobile phone, or any other suitable interface or combinations thereof.

At 401, the method 400 includes heating the barrel. In some implementations, the barrel can have less than about 50 mL, less than about 45 mL, less than about 40 mL, less than about 35 mL, less than about 30 mL, less than about 25 mL, less than about 20 mL, less than about 15 mL, less than about 10 mL, less than about 9 mL, less than about 8 mL, less than about 7 mL, less than about 6 mL, less than about 5 mL, less than about 4 mL, less than about 3 mL, less than about 2 mL, or less than about 1 mL of free liquid. In some implementations, the heating can be for a duration of at least about 30 seconds, at least about 40 seconds, at least about 50 seconds, at least about 1 minute, at least about 2 minutes, at least about 3 minutes, at least about 4 minutes, at least about 5 minutes, at least about 6 minutes, at least about 7 minutes, at least about 8 minutes, at least about 9 minutes, at least about 10 minutes, at least about 15 minutes, at least about 20 minutes, at least about 25 minutes, at least about 30 minutes, at least about 35 minutes, at least about 40 minutes, at least about 45 minutes, at least about 50 minutes, or at least about 55 minutes. In some implementations, the heating can be for no more than about 60 minutes, no more than about 55 minutes, no more than about 50 minutes, no more than about 45 minutes, no more than about 40 minutes, no more than about 35 minutes, no more than about 30 minutes, no more than about 25 minutes, no more than about 20 minutes, no more than about 15 minutes, no more than about 10 minutes, no more than about 9 minutes, no more than about 8 minutes, no more than about 7 minutes, no more than about 6 minutes, no more than about 5 minutes, no more than about 4 minutes, no more than about 3 minutes, no more than about 2 minutes, no more than about 1 minute, no more than about 50 seconds, or no more than about 40 seconds.

Combinations of the above-referenced heating times are also possible (e.g., at least about 30 seconds and no more than about 60 minutes or at least about 5 minutes and no more than about 20 minutes), inclusive of all values and ranges therebetween. In some implementations, heating can be for about 30 seconds, about 40 seconds, about 50 seconds, about 1 minute, about 2 minutes, about 3 minutes, about 4 minutes, about 5 minutes, about 6 minutes, about 7 minutes, about 8 minutes, about 9 minutes, about 10 minutes, about 15 minutes, about 20 minutes, about 25 minutes, about 30 minutes, about 35 minutes, about 40 minutes, about 45 minutes, about 50 minutes, about 55 minutes, or about 60 minutes.

In some implementations, the heating can be via oven heating, a heated blanket, radiative heating, solar radiation, induction heating, or any combination thereof. In some implementations, step 401 can include rolling the barrel through an oven. In some implementations, the rolling can be by hand (i.e., manual). In some implementations, the rolling can be automated. In some implementations, the barrel can be conveyed via a conveyor. In some implementations, the method 400 can include dehumidifying oven during the heating to prevent water from entering the pores of the barrel and diluting the liquid to be extracted.

At 402, which is optional, a surface of a funnel contacts an outer surface of a barrel via a gasket. The funnel can be coupled to a tube that is fluidically coupled to a storage volume. In some implementations, the funnel can be coupled and sealed to the outer surface of the barrel such that it covers the bung hole.

At 403, a negative pressure is applied to an interior of a vessel in which the barrel is disposed, such that an amount of liquid flows from the barrel. During the initial production of the typical barrel, the barrel staves are treated (e.g., via hot water treatment or cold water treatment), and the bourbon barrels are charred prior to affixing the staves with hoops. The production process aids in preventing liquid from leaking from the inside of the barrel. Extractable spirits generally do not permeate past inner halves of the staves. Accordingly, application of the negative pressure causes the spirits to move to the interior of the barrel rather than the exterior. Some liquid can also permeate into the checking of the charring of the inner surface, such that it can be extracted to the interior of the barrel with the application of negative pressure. Gravity can then guide this extracted liquid to the bung hole of the barrel such that it flows out of the barrel. In some implementations, the vessel can house a single barrel at a time. In other words, a single barrel can be processed at one time in the vessel at 403.

In some implementations, the barrel can be transported to the vessel via rolling, conveying, forklift, or any combination thereof. In some implementations, placement of the barrel in the vessel can be manual. In some implementations, placement of the barrel can be automated. In some implementations, the barrel can be placed such that the bung hole points downward, such that the liquid can flow out of the bung hole. In some implementations, the barrel can be placed such that the bung hole lines up with the funnel. Liquid flows from the barrel into the tubing (e.g., via the funnel). In some implementations, liquid can flow directly from the barrel into the tubing without the funnel. In some implementations, step 403 can include dehumidifying to prevent water from entering the barrel or the pores of the barrel.

At 404, the liquid is collected within a collection chamber. In some implementations, the collection chamber can be outside of the vessel, where the negative pressure was applied. In some implementations, the method 400 can collect at least about 100 mL, at least about 200 mL, at least about 300 mL, at least about 400 mL, at least about 500 mL, at least about 600 mL, at least about 700 mL, at least about 800 mL, at least about 900 mL, at least about 1 L, at least about 1.1 L, at least about 1.2 L, at least about 1.3 L, at least about 1.4 L, at least about 1.5 L, at least about 1.6 L, at least about 1.7 L, at least about 1.8 L, at least about 1.9 L, or at least about 2 L of liquid from a single barrel, inclusive of all values and ranges therebetween. In some implementations, the liquid captured from the barrel can have the same or a substantially similar alcohol content to the liquid that was originally stored in the barrel. In some implementations, the method 400 can be absent of any positive pressurization of the barrel.

Figure 5:
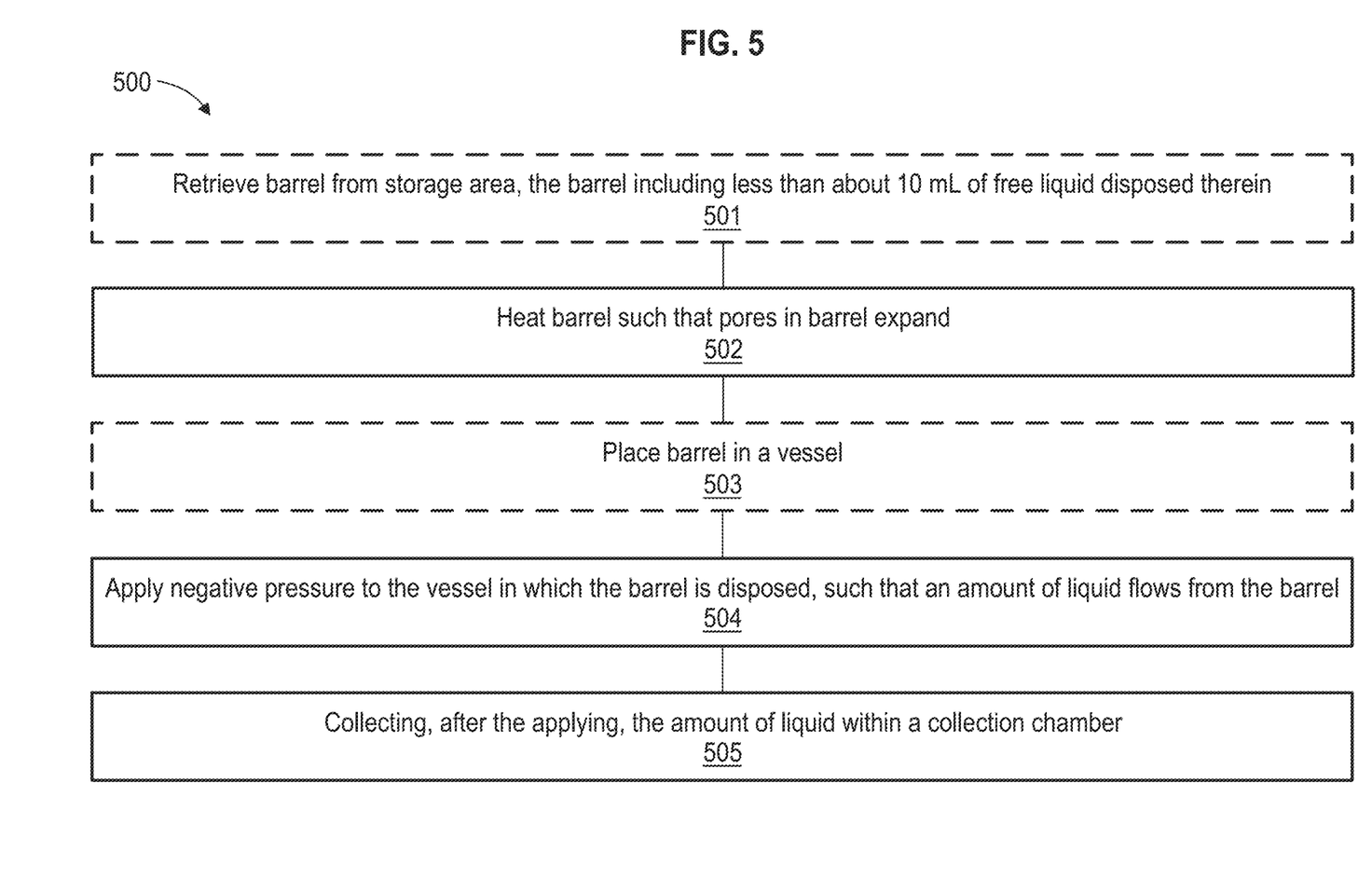
FIG. 5 is a block diagram of a method of extracting liquid from a barrel, according to an embodiment.

FIG. 5 is a block diagram of a method 500 of extracting liquid from a barrel, according to an embodiment. As shown, the method 500 optionally includes retrieving a barrel from the storage area at 501, the barrel including less than about 10 mL of free liquid disposed therein. The method 500 includes heating the barrel at 502 such that pores in the barrel expand. At 503, the method 500 optionally includes placing the barrel in a vessel. At 504, a negative pressure is applied to the vessel in which the barrel is disposed, such that an amount of liquid flows from the barrel. At 505, after the applying, the amount of liquid is collected within a collection chamber 505. In some implementations, any of the steps of the method 500 can be implemented via a user interface.

At 501, the barrel is retrieved from a storage area and at 502 the barrel is heated such that pores of the barrel expand. In some implementations, the retrieval of the barrel can be manual. In some implementations, the retrieval of the barrel can be automated (e.g., controlled by a user interface). In some implementations, the retrieval of the barrel can be via a forklift. In some implementations, step 502 can be the same or substantially similar to step 401, as described above with reference to FIG. 4. Thus, certain aspects of step 502 are not described in greater detail herein.

At 503, which is optional, the barrel is placed into a vessel. In some implementations, the barrel can be positioned on top of a base frame inside the vessel. In some implementations, the barrel can be positioned such that the bung hole of the barrel is directly above an opening of a collection tube. The collection tube can receive liquid flowing out the barrel via the bung hole. At 504, a negative pressure is applied to the vessel, and at 505, after the applying, the amount of liquid is collected within a collection chamber. In some implementations, the vessel can be a vacuum chamber or a negative pressure chamber. In some implementations, the barrel can be conveyed, manually placed, rolled, or placed by forklift into the vessel. In some implementations, steps 504 and 505 can be the same or substantially similar to step 403 and 404, as described above with reference to FIG. 4. Thus, certain aspects of steps 504 and 505 are not described in greater detail herein.

Various concepts may be embodied as one or more methods, of which at least one example has been provided. The acts performed as part of the method may be ordered in any suitable way.

Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

While specific embodiments of the present disclosure have been outlined above, many alternatives, modifications, and variations will be apparent to those skilled in the art. Accordingly, the embodiments set forth herein are intended to be illustrative, not limiting. Various changes may be made without departing from the spirit and scope of the disclosure. Where methods and steps described above indicate certain events occurring in a certain order, those of ordinary skill in the art having the benefit of this disclosure would recognize that the ordering of certain steps may be modified and such modification are in accordance with the variations of the invention. Additionally, certain of the steps may be performed concurrently in a parallel process when possible, as well as performed sequentially as described above. The embodiments have been particularly shown and described, but it will be understood that various changes in form and details may be made.

The invention claimed is:

1. A system, comprising:
a loading station configured to receive a barrel;
a heating station configured to receive the barrel from the loading station and heat the barrel; and
a vacuum station configured to receive the barrel from the heating station and apply a negative pressure to extract liquid from the barrel.

2. The system of claim 1, wherein the vacuum station includes a negative pressure vessel, a tube fluidically coupled to the interior of the negative pressure vessel, a storage volume, and a pump configured to facilitate the movement of liquid from inside the negative pressure vessel to the storage volume via the tube.

3. The system of claim 1, wherein:
the vacuum station includes a negative pressure vessel, a tube fluidically coupled to the interior of the negative pressure vessel, and a pump configured to facilitate the movement of liquid from inside the negative pressure vessel to the storage volume via the tube,
the pump is disposed outside the vessel and fluidically coupled to the tube, the pump configured to facilitate movement of liquid through the tube.

4. The system of claim 1, wherein:
the vacuum station includes a negative pressure vessel, a tube fluidically coupled to the interior of the negative pressure vessel, and a pump configured to facilitate the movement of liquid from inside the negative pressure vessel to the storage volume via the tube,
the vessel includes a first door and a second door opposite the first door, each of the first door and the second door sized and configured to receive the barrel into and out of the interior of the vessel.

5. The system of claim 1, wherein:
the vacuum station includes a negative pressure vessel, a tube fluidically coupled to the interior of the negative pressure vessel, and a pump configured to facilitate the movement of liquid from inside the negative pressure vessel to the storage volume via the tube,
the barrel is a first barrel, the interior of the vessel is sized to receive the first barrel and not a second barrel at a time.

6. The system of claim 1, wherein:
the vacuum station includes a negative pressure vessel, a tube fluidically coupled to the interior of the negative pressure vessel, and a funnel that is disposed within the interior of the negative pressure vessel, the funnel configured to receive the liquid flowing from the barrel while under the negative pressure and transport the liquid to the tube.

7. The system of claim of claim 1, wherein the vacuum station includes a negative pressure vessel having a floor and a base frame on the floor of the negative pressure vessel, the base frame configured to support the barrel placed thereon.

8. A system, comprising:
a heating station configured to receive a barrel from a loading station and heat the barrel;
a vacuum station configured to receive the barrel from the heating station and apply a negative pressure to extract liquid from the barrel; and
a platform within an assembly line, the platform configured to receive the barrel from the vacuum station.

9. The system of claim 8, wherein the vacuum station includes a negative pressure vessel, a tube fluidically coupled to the interior of the negative pressure vessel, a storage volume, and a pump configured to facilitate the movement of liquid from inside the negative pressure vessel to the storage volume via the tube.

10. The system of claim 8, wherein:
the vacuum station includes a negative pressure vessel, a tube fluidically coupled to the interior of the negative pressure vessel, and a pump configured to facilitate the movement of liquid from inside the negative pressure vessel to the storage volume via the tube,
the pump is disposed outside the vessel and fluidically coupled to the tube, the pump configured to facilitate movement of liquid through the tube.

11. The system of claim 8, wherein:
the vacuum station includes a negative pressure vessel, a tube fluidically coupled to the interior of the negative pressure vessel, and a pump configured to facilitate the movement of liquid from inside the negative pressure vessel to the storage volume via the tube,
the vessel includes a first door and a second door opposite the first door, each of the first door and the second door sized and configured to receive the barrel into and out of the interior of the vessel.

12. The system of claim 8, wherein:
the vacuum station includes a negative pressure vessel, a tube fluidically coupled to the interior of the negative pressure vessel, and a pump configured to facilitate the movement of liquid from inside the negative pressure vessel to the storage volume via the tube,
the barrel is a first barrel, the interior of the vessel is sized to receive the first barrel and not a second barrel at a time.

13. The system of claim 8, wherein the vacuum station includes a negative pressure vessel having a floor and a base frame on the floor of the negative pressure vessel, the base frame configured to support the barrel placed thereon.

14. A system, comprising:
a heating station configured to receive a barrel from a loading station and heat the barrel; and
a vacuum station configured to receive the barrel from the heating station and apply a negative pressure to extract liquid from the barrel,
the vacuum station includes a negative pressure vessel, a tube fluidically coupled to the interior of the negative pressure vessel, and a pump configured to facilitate the movement of liquid from inside the negative pressure vessel to the storage volume via the tube.

15. The system of claim 14, wherein:
the pump is disposed outside the negative pressure vessel and fluidically coupled to the tube, the pump configured to facilitate movement of liquid through the tube.

16. The system of claim 14, wherein:
the negative pressure vessel includes a first door and a second door opposite the first door, each of the first door and the second door sized and configured to receive the barrel into and out of the interior of the negative pressure vessel.

17. The system of claim 14, wherein:
the barrel is a first barrel, the interior of the negative pressure vessel is sized to receive the first barrel and not a second barrel at a time.

* * * * *